United States Patent [19]

Mori et al.

[11] 4,306,943

[45] Dec. 22, 1981

[54] PURIFICATION OF POLYETHER-POLYOL

[75] Inventors: Shigeo Mori; Takeshi Fujita, both of Kyoto, Japan

[73] Assignee: Dai-Ichi Kogyo Seiyaku Co., Ltd., Kyoto, Japan

[21] Appl. No.: 243,118

[22] Filed: Mar. 12, 1981

[30] Foreign Application Priority Data

Oct. 20, 1980 [JP] Japan ............................ 55-147356

[51] Int. Cl.$^3$ .......................... B01D 3/34; C07C 43/11
[52] U.S. Cl. ........................................ 203/29; 203/14; 203/33; 203/34; 203/35; 203/36; 203/37; 203/41; 203/47; 568/621
[58] Field of Search ...................... 203/33–37, 203/29, 41, 47, 48, 91, 14; 568/621

[56] References Cited

U.S. PATENT DOCUMENTS

| | | | |
|---|---|---|---|
| 2,996,550 | 8/1961 | Simons | 568/621 |
| 3,271,462 | 9/1966 | Earing | 568/621 |
| 3,326,985 | 6/1967 | Mason | 568/621 |
| 3,915,674 | 10/1975 | Smith | 568/621 |
| 4,137,398 | 1/1979 | Muzzio | 568/621 |
| 4,254,287 | 3/1981 | Ziegenhain et al. | 568/621 |

FOREIGN PATENT DOCUMENTS 55-108823  8/1980  Japan ................................ 568/621

*Primary Examiner*—Wilbur L. Bascomb, Jr.
*Attorney, Agent, or Firm*—Millen & White

[57] ABSTRACT

Crude liquid polyether-polyols containing an alkaline catalyst are purified by the steps of:
  neutralizing said crude liquid polyether-polyol with a mineral acid having a dissociation constant of greater than $10^{-3}$ at 25° C.
  distilling off water from said liquid, and filtering the same. The improvement resides in the step of adding a hydrate of a metal salt of said mineral acid to the liquid polyether-polyol at a stage before the distillation step for promoting the crystal growth of a salt formed from said alkaline catalyst by the neutralization.

10 Claims, No Drawings

PURIFICATION OF POLYETHER-POLYOL

This invention relates to a method for purifying crude liquid polyether-polyols containing alkaline catalysts.

Polyether-polyols are conventionally produced by the addition-polymerization reaction of an alkylene oxide with an organic compound having at last one active hydrogen atom in the presence of an alkaline catalyst. The resulting reaction mixture, therefore, necessarily contains substantial amounts of these alkaline catalysts. The presence of the alkaline catalyst remaining in the polyether-polyols adversely affects on the performance thereof for their intended uses such as raw materials for the production of polyurethanes, hydraulic liquids, cosmetics, surfactants, synthetic lubricants and the like.

Various attempts have been made to purify the crude polyether-polyols by removing the alkaline catalyst and other impurities therefrom. These attempts include, for example, neutralization with acid and removal of the resulting salts, selective adsorption of alkaline catalysts, removal of alkaline catalysts by ion-exchange technique and the like.

Unfortunately these methods have been found uneconomical and disadvantageous. For example, when the crude liquid polyether-polyols are neutralized with an acid and crystals of the resulting salt are filtered off, great difficulties are present in the filtering step since the crystal particles are too fine.

According to the present invention, crude liquid polyether-polyols containing an alkaline catalyst are purified by the steps of neutralizing said crude polyether-polyols with a mineral acid having a dissociation constant of greater than $10^{-3}$ at 25° C., distilling off water from said liquid, and filtering the same. The improvement resides in the step of adding a hydrate of a metal salt of said mineral acid at a stage before the distillation step. The addition of said hydrate promotes the crystal growth of a salt formed from the alkaline catalyst by the neutralization to facilitate the removal of crystals of said salt by filtration.

Preferably, an adsorbent for acid or alkali is also added to the neutralized liquid polyether-polyol at a stage before the distillation step.

The starting crude liquid polyether-polyols may be produced by the well-known method, namely by reacting an alkylene oxide with an organic compound having at least one hydrogen atom in the presence of an alkaline catalyst. Examples of organic compounds having at least one active hydrogen atom include monohydric alcohols such as methanol, ethanol, butanol, octanol and lauryl alcohol, dihydric alcohols such as ethylene glycol, propylene glycol and 1,4-butanediol, polyhydric alcohols such as glycerine, trimethylolpropane, pentaerythritol, sorbitol and sucrose, and amines such as aniline, ethylenediamine, diethylenetriamine and tolylenediamine.

Examples of alkylene oxides include ethylene oxide, propylene oxide, butylene oxide and stylene oxide.

Examples of alkaline catalysts include potassium hydroxide, sodium hydroxide, sodium methoxide, metallic potassium, potassium carbonate and sodium carbonate.

The resulting crude polyether-polyol generally occurs as a viscous liquid containing from 0.1 to 1% by weight of the alkaline catalyst. According to the invention, crude liquid polyether-polyols thus produced are neutralized with a mineral acid having a dissociation constant of greater than $10^{-3}$ at 25° C. It should be noted that the term "dissociation constant" used herein stands for the primary dissociation constant when the mineral acid is a polybasic acid.

Examples of mineral acids having said dissociation constant include $H_2SO_4$, $HCl$, $HNO_3$, $HClO_2$, $NH_2SO_3H$, $H_2S_2O_3$, $H_2PO_2$, $H_4P_2O_7$, $HClO_3$, $HIO_3$, $H_3PO_4$, $H_3PO_3$ and $H_2SO_3$. The amount of said mineral acid is preferably a neutralization equivalent corresponding to the amount of alkaline catalyst present in the crude polyether-polyol. If necessary, water may be added to the crude polyether-polyol prior to the neutralization step in an amount of less than 10%, preferably from 0.5 to 2% based on the weight of the crude polyether-polyol.

According to the invention, a hydrate of a metal salt of said mineral acid is added to the crude polyether-polyol. Examples of hydrates which may be employed include $Na_2SO_3 \cdot 7H_2O$, $Na_2HPO_4 \cdot 12H_2O$, $NaH_2PO_4 \cdot H_2O$, $MgSO_4 \cdot H_2O$, $MgSO_4 \cdot 7H_2O$, $K_2Mg(SO_4)_2 \cdot 6H_2O$, $Na_2SO_4 \cdot 10H_2O$, $CaSO_4 \cdot 2H_2O$, $NaAl(SO_4)_2 \cdot 12H_2O$, $KAl(SO_4)_2 \cdot 12H_2O$, $ZnSO_4 \cdot 7H_2O$, $Na_2S_2O_3 \cdot 5H_2O$, $NaBr \cdot 2H_2O$, $CaCl_2 \cdot 6H_2O$ and $AlCl_3 \cdot 6H_2O$.

The hydrates may take any particulate form such as powder, crystals and granules. They are added in amounts of generally less than 1%, preferably from 0.01 to 0.3% based on the weight of crude polyether-polyol at a stage before the distillation of crude polyether-polyol. Namely, the hydrate may be added prior to, simultaneously with or subsequent to the addition of neutralizing mineral acid. The acid moiety forming said salt hydrate may not necessarily be identical with the mineral acid used for the neutralization of crude polyether-polyols.

However, it is important for the present invention that the acid moiety forming said salt hydrate also has a dissociation constant of greater than $10^{-3}$ and the salt formed has at least one mole of water of crystallization. Experiments have shown that only these salt hydrates can promote the crystal growth of a salt formed from the alkaline catalyst by the neutralization and thus facilitate the removal of crystals by filtration. It has been also found that other acids having a dissociation constant lower than said value such as boric acid and organic acids are not suitable for this purpose.

It is preferable to add an adsorbent to the neutralized liquid at a stage before the distillation for removing any residue of acid or alkali. Examples of acid-adsorbents include oxides, carbonates, hydroxides and silicates of Ca, Mg, Al and their complexes such as $MgCO_3$, $CaCO_3$, $2.5MgO \cdot Al_3 \cdot xH_2O$, $Mg_6Al_2(OH)_{16}CO_3 \cdot 4H_2O$, synthetic magnesium silicate, calcium silicate and synthetic aluminum silicate. Examples of alkali-adsorbents include synthetic magnesium silicate, synthetic aluminum silicate, activated bentonite, acid bentonite and their mixtures. The amount of adsorbent to be added is less than 2%, preferably from 0.05 to 0.5% based on the weight of starting crude polyether-polyol.

The resulting mixture is then distilled to remove water at a temperature above 80° C., e.g. 100°–140° C. and filtered in per se known manner. The hydrate added acts as seed crystals for promoting the crystal growth of a salt formed from the alkaline catalyst by the neutralization. Accordingly, the removal of a salt formed from the alkaline catalyst may be greatly facilitated. The resulting purified polyether-polyols are thus almost completely free from the alkaline catalyst and are suitable for use in the production of polyurethane foam, hydraulic liquids, cosmetics, surfactants, synthetic lubricants and the like.

To further illustrate the invention, the following examples are presented. Unless otherwise indicated all parts and percentages are by weight.

EXAMPLE 1

92g of glycerine was reacted with 2,500 g of propylene oxide at 130° C. at 10 kg/cm$^2$G in the presence of 7.5 g of 85% potassium hydroxide and then with 500 g of ethylene oxide at 120° C. at 3 kg/cm$^2$G.

To the resulting crude polyether-polyol was added 30 g of water with stirring and the mixture was neutralized with 9 g of 62% sulfuric acid at 90° C. with stirring. The pH was then at 6.4.

To the mixure were added 3 g of MgSO$_4$.7H$_2$O and 15 g of synthetic magnesium silicate with stirring. Then the mixture was distilled at 120° C. under vacuum less than 10 mmHg to remove water and filtered through a glass filter with the aid of diatomaceous earth. The filtrate showed the following analysis and was of quality suitable for the production of polyurethane resins.

| Acid number, mgKOH/g | 0.007 |
|---|---|
| Water content, % | 0.016 |
| Sodium, ppm | 0.05 |
| Potassium, ppm | 0.10 |
| pH | 7.0 |
| Hydroxyl number, mgKOH/g | 56.8 |
| Appearance | Colorless, transparent liquid |

EXAMPLE 2

Crude polyether-polyol produced in Example 1 was neutralized with 18.5 g of 30% phosphoric acid at 80° C. with stirring. The pH was then at 7.6.

To the mixture was added 30 g of synthetic aluminum silicate. The mixture was stirred for 120 minutes. Then 3 g of CaHPO$_4$.2H$_2$O was added thereto. The mixture was distilled at 120° C. under vacuum less than 10 mmHg to remove water and filtered through a glass filter with the aid of diatomaceus earth. The filtrate showed the following analysis and was of quality suitable for the production of polyurethane resins.

| Acid number, mgKOH/g | 0.005 |
|---|---|
| Water content, % | 0.014 |
| Sodium, ppm | 0.05 |
| Potassium, ppm | 0.10 |
| pH | 7.0 |
| Hydroxyl number, mgKOH/g | 56.7 |
| Appearance | Colorless, transparent liquid |

EXAMPLE 3

Polyether-polyols A, B and C were synthesized in the following manner.

Polyether-polyol A:

A 200 liter stainless steel autoclave was charaged with 4.8 kg of glycerine and 850 g of 85% potassium hydroxide, and then purged with nitrogen gas. The mixture was reacted with 145.2 kg of propylene oxide at 125° C. at 6 kg/cm$^2$G and then with 30 kg of ethylene oxide at 115° C. at 2 kg/cm$^2$G.

Polyether-polyol B:

A 200 liter stainless steel autoclave was charged with 50 kg of 70% sucrose syrup, 5 kg of ethylene glycol, 10 kg of ethylenediamine and 375 g of 48% sodium hydroxide, and then purged with nitrogen gas. The mixture was heated at 105° C. and reacted with 50 kg of propylene oxide. Water was distilled off at 125° C. and 65 kg of propylene oxide was further reacted at 125° C. at 2 kg/cm$^2$G.

Polyether-polyol C:

A 200 liter stainless steel autoclave was charged with 6 kg of 70% sorbitol, 6 kg of dipropyleneglycol and 800 g of 48% sodium hydroxide. Water was distilled off at 125° C. under vacuum less than 10 mmHg. The mixture was reacted with 180 kg of propylene oxide at 125° C. at 5 kg/cm$^2$G and then with 6 kg of ethylene oxide at 115° C. at 2 kg/cm$^2$G.

Polyether-polyols A, B and C were purified by the method of this invention, respectively. Conditions and the results obtained are shown in Table 1. Filtration was carried out by using a membrane filter (ULTRAFILTER, Miura Chemical Co., Ltd.).

TABLE 1

| Run No. | 3-1 | 3-2 | 3-3 | 3-4 | 3-5 | 3-6 |
|---|---|---|---|---|---|---|
| Conditions | | | | | | |
| Polyether-polyol | A | A | A | A | B | B |
| Water added, kg | 3 | 0 | 1 | 0 | 0 | 0 |
| Acid and conc. | 98% H$_3$PO$_4$ | 10% HCl | 62% H$_2$SO$_4$ | 20% H$_3$PO$_3$ | 20% NH$_2$SO$_3$H | 20% H$_2$PO$_2$ |
| Amount of acid, kg | 0.6 | 4.7 | 1.02 | 5.3 | 2.2 | 1.1 |
| Neutralization temp., °C. | 80 | 90 | 70 | 70 | 70 | 50 |
| Neutralization time, min. | 15 | 30 | 40 | 40 | 20 | 20 |
| pH after neutralization | 6.7 | 7.0 | 6.3 | 7.5 | 9.4 | 8.9 |
| Adsorbent *1 | 2 | — | 3 | 1 | 2 | 1 |
| Amount of Adsorbent, kg | 0.5 | — | 1 | 0.4 | 0.5 | 0.4 |
| Adsorption temp., °C. | 80 | — | 95 | 60 | 60 | 70 |
| Adsorption time, min. | 60 | — | 120 | 150 | 40 | 80 |
| Distillation temp., °C. | 120 | 120 | 130 | 120 | 130 | 130 |
| Hydrate *2 | III | IV | VI | II | III | III |
| Amount of hydrate, kg | 0.2 | 0.4 | 0.3 | 0.1 | 0.5 | 0.05 |
| Stage of addition *3 | d | a | b | c | f | e |
| Form of hydrate | crystal | crystal | powder | crystal | crystal | crystal |
| Analysis | | | | | | |
| H$_2$O content, % | 0.02 | 0.015 | 0.010 | 0.015 | 0.015 | 0.010 |
| pH | 7.0 | 6.8 | 7.0 | 7.0 | 9.5 | 9.8 |
| Na, ppm | 0 | 0 | 0 | 0 | 0.2 | 0.3 |
| K, ppm | 0.1 | 0 | 0.1 | 0.1 | 0 | 0 |
| OH number, mgKOH/g | 52 | 52 | 52 | 52 | 500 | 501 |
| Unsaturation degree, meq/g | 0.028 | 0.028 | 0.028 | 0.028 | 0.001 | 0.001 |
| Run No. | 3-7 | 3-8 | 3-9 | 3-10 | 3-11 | 3-12 |

TABLE 1-continued

| Conditions | | | | | | |
|---|---|---|---|---|---|---|
| Polyether-polyol | B | B | C | C | C | C |
| Water added, kg | 0 | 0 | 2 | 0 | 1 | 0 |
| Acid and conc. | 30% H$_3$PO$_3$ | 35% H$_2$SO$_4$ | 75% H$_3$PO$_4$ | 20% HIO$_3$ | 35% H$_2$SO$_4$ | 10% HCl |
| Amount of acid, kg | 1.2 | 0.63 | 0.85 | 6.0 | 0.96 | 2.5 |
| Neutralization temp., °C. | 60 | 50 | 80 | 90 | 70 | 60 |
| Neutralization time, min. | 15 | 10 | 30 | 30 | 20 | 20 |
| pH after neutralization | 8.8 | 8.7 | 6.5 | 7.4 | 6.7 | 7.0 |
| Adsorbent *1 | 1 | 2 | 3 | 4 | 5 | — |
| Amount of Adsorbent, kg | 0.2 | 0.5 | 0.1 | 4 | 0.2 | — |
| Adsorption temp., °C. | 80 | 100 | 120 | 80 | 70 | — |
| Adsorption time, min. | 90 | 120 | 100 | 180 | 60 | — |
| Distillation temp., °C. | 130 | 100 | 120 | 120 | 100 | 100 |
| Hydrate *2 | III | VI | III | III | I | IV |
| Amount of hydrate, kg | 0.1 | 0.4 | 1.0 | 2.0 | 0.2 | 0.1 |
| Stage of addition *3 | d | c | e | c | a | d |
| Form of hydrate | crystal | crystal | crystal | crystal | powder | crystal |
| Analysis | | | | | | |
| H$_2$O content, % | 0.009 | 0.05 | 0.05 | 0.04 | 0.02 | 0.02 |
| pH | 10.0 | 9.7 | 7.0 | 7.0 | 6.9 | 7.0 |
| Na, ppm | 0.2 | 0.4 | 0 | 0 | 0 | 0 |
| K, ppm | 0 | 0 | 0.1 | 0 | 0 | 0.1 |
| OH number, mgKOH/g | 500 | 502 | 38 | 38 | 38 | 38 |
| Unsaturation degree, meq/g | 0.001 | 0.001 | 0.042 | 0.042 | 0.042 | 0.042 |

*1 Adsorbent
1 Synthetic aluminum silicate
2 Synthetic magnesium silicate
3 2.5MgO . Al$_2$O$_3$ . xH$_2$O
4 Activated bentonite
5 Magnesium carbonate
*2 Hydrate
I CaSO$_4$ . 2H$_2$O
II Na$_2$SO$_4$ . 7H$_2$O
III NaH$_2$PO$_4$ . H$_2$O
IV CaCl$_2$ . 6H$_2$O
V MgSO$_4$ . 7H$_2$O
VI KAl(SO$_4$)$_2$ . 12H$_2$O
*3 Stage of addition of hydrate
a Immediately before neutralization
b Addition with water before neutralization
c Addition with acid
d Immediately after neutralization
e Addition with adsorbent after neutralization
f Addition after adding adsorbent

EXAMPLE 4

In Example 3, samples were taken from the filtrate at different elapsed times of filtration and the contents of Na and K in each fraction were analyzed. The results are shown in Table 2. Variation is very small in each run.

TABLE 2

| Run No. | | 3-1 | 3-2 | 3-3 | 3-4 | 3-5 | 3-6 | 3-7 | 3-8 | 3-9 | 3-10 | 3-11 | 3-12 |
|---|---|---|---|---|---|---|---|---|---|---|---|---|---|
| Time lapsed, min. | | | | | | | | | | | | | |
| 10 | K (ppm) | 0.2 | 0.3 | 0.2 | 0.2 | 0 | 0.1 | 0.1 | 0.1 | 0.3 | 0.2 | 0.4 | 0.2 |
|  | Na | 0 | 0.1 | 0.1 | 0.1 | 0.3 | 0.5 | 0.3 | 0.2 | 0 | 0 | 0 | 0.1 |
| 20 | K | 0.2 | 0.3 | 0.2 | 0.2 | 0 | 0.1 | 0.1 | 0.2 | 0.3 | 0.2 | 0.2 | 0.1 |
|  | Na | 0 | 0.1 | 0 | 0 | 0.2 | 0.5 | 0.3 | 0.2 | 0 | 0 | 0 | 0.1 |
| 30 | K | 0.1 | 0.3 | 0.2 | 0.2 | 0 | 0.1 | 0.1 | 0.2 | 0.3 | 0.2 | 0.2 | 0.1 |
|  | Na | 0 | 0 | 0 | 0 | 0.1 | 0.4 | 0.3 | 0.2 | 0 | 0 | 0 | 0 |
| 40 | K | 0.1 | 0.3 | 0.2 | 0.1 | 0 | 0.1 | 0 | 0.2 | 0.2 | 0.1 | 0.2 | 0.1 |
|  | Na | 0 | 0 | 0 | 0 | 0.1 | 0.4 | 0.3 | 0.1 | 0 | 0 | 0 | 0 |
| 50 | K | 0.1 | 0.2 | 0.2 | 0.1 | 0 | 0 | 0 | 0.1 | 0.2 | 0.1 | 0.1 | 0.1 |
|  | Na | 0 | 0 | 0 | 0 | 0.1 | 0.4 | 0.2 | 0.1 | 0 | 0 | 0 | 0 |
| 60 | K | 0.1 | 0.2 | 0.2 | 0.1 | 0 | 0 | 0 | 0.1 | 0.2 | 0.1 | 0.1 | 0.1 |
|  | Na | 0 | 0 | 0 | 0 | 0.1 | 0.4 | 0.2 | 0.1 | 0 | 0 | 0 | 0 |
| 70 | K | 0.1 | 0.2 | 0.2 | 0 | 0 | 0 | 0 | 0.1 | 0.2 | 0.1 | 0.1 | 0.1 |
|  | Na | 0 | 0 | 0 | 0 | 0.1 | 0.3 | 0.2 | 0.1 | 0 | 0 | 0 | 0 |
| 80 | K | 0.1 | 0.1 | 0.2 | 0 | 0 | 0 | 0 | 0.1 | 0.2 | 0.1 | 0.1 | 0.1 |
|  | Na | 0 | 0 | 0 | 0 | 0.1 | 0.3 | 0.1 | 0.1 | 0 | 0 | 0 | 0 |
| 90 | K | 0.1 | 0.1 | 0.2 | 0 | 0 | 0 | 0 | 0.1 | 0.2 | 0 | 0.1 | finish |
|  | Na | 0 | 0 | 0 | 0 | 0.1 | 0.3 | 0.1 | 0.1 | 0 | 0 | 0 |  |
| 100 | K | finish | 0.1 | finish | finish | 0 | 0 | 0 | 0.1 | 0.1 | 0 | finish |  |
|  | Na |  | 0 |  |  | 0.1 | 0.2 | 0.1 | 0.1 | 0 | 0 |  |  |
| 110 | K |  | finish |  |  | 0 | 0 | 0 | 0.1 | finish | 0 |  |  |
|  | Na |  |  |  |  | 0.1 | 0.2 | 0.1 | 0.1 |  | finish |  |  |
| 120 | K |  |  |  |  | finish | 0 | finish | finish |  |  |  |  |
|  | Na |  |  |  |  |  | 0.2 |  |  |  |  |  |  |
| 130 | K |  |  |  |  |  | finish |  |  |  |  |  |  |
|  | Na |  |  |  |  |  |  |  |  |  |  |  |  |
| 140 | K |  |  |  |  |  |  |  |  |  |  |  |  |

TABLE 2-continued

| Run No. | 3-1 | 3-2 | 3-3 | 3-4 | 3-5 | 3-6 | 3-7 | 3-8 | 3-9 | 3-10 | 3-11 | 3-12 |
|---|---|---|---|---|---|---|---|---|---|---|---|---|
| Na | | | | | | | | | | | | |

CONTROL EXAMPLE 1

Crude polyether-polyol produced in Example 1 was neutralized with 37.1 g of 30% phosphoric acid. The pH was then at 5.6.

15 g of adsorbent $2.5MgO.Al_2O_3.xH_2O$ was added and the mixture was stirred at 90° C. for 2 hours. Water was removed at 120° C. under vacuum less than 10 mmHg and the mixture was filtered through a glass filter with the aid of diatomaceous earth. The filtrate contained suspended white fine particles and possesed a strong order of aldehyde.

| Analysis | |
|---|---|
| Water content, % | 0.014 |
| Acid number, mgKOH/g | 0.21 |
| pH | 6.0 |
| Na, ppm | 0.10 |
| K, ppm | 142 |
| OH number, mgKOH/g | 57.1 |
| Appearance | White opaque liquid |

CONTROL EXAMPLE 2

Crude polyether-polyol produced in Example 1 was treated by the following Method 1 through Method 5.

Method 1:
Crude polyether-polyol was neutralized with 37.1 g of 30% phosphoric acid, distilled at 120° C. under vacuum less than 10 mmHg for removing water and then filtered with the aid of diatomaceous earth.

Method 2:
31 g of synthetic magnesium silicate and 60 g of water were added to crude polyether-polyol. The mixture was stirred at 120° C. for 1 hour and then distilled at 120° C. for removing water. The mixture was filtered with the aid of diatomaceous earth.

Method 3:
Crude polyether-polyol was dissolved in 2,000 g of n-hexane. 2,000 g of water was added to the solution. After standing for 24 hours, the mixture remained as an emulsion and no phase-separation occurred.

Method 4:
6 g of water was added to the crude polyether-polyol. 8.5 g of carbon dioxide gas was bubbled into the liquid at 55° C. to neutralize the liquid. The pH was then at 6.7. Then nitrogen gas was bubbled into the liquid at 55° C. for 30 minutes. The liquid was then dehydrated by topping distillation at 120° C. under vacuum less than 10 mmHg, and filtered with the aid of diatomaceus earth.

Method 5:
Crude polyether-polyol was mixed with 150 g of water. The mixture was passed through a column of a cation exchange resin (H type, DIA-ION SKIB, Mitsubishi Chemical) at 80° C. at a space velocity of 12.5. The passed mixture was then evaporator at 120° C. under vacuum less than 10 mmHg.

Analysis of the resulting polyether-polyols are shown in Table 3.

TABLE 3

| Method No. | 1 | 2 | 4 | 5 |
|---|---|---|---|---|
| Water content, % | 0.057 | 0.031 | 0.016 | 0.15 |
| Acid number, mgKOH/g | 0.25 | 0.002 | 0.06 | 0.001 |
| Na, ppm | 0.10 | 0.1 | 0.1 | 0.5 |
| K, ppm | 18.0 | 11.2 | 2.5 | 9.2 |
| OH number, mgKOH/g | 58.0 | 55.9 | 56.2 | 56.0 |
| Color *4 | 20 | 80 | 10 | 120 |
| pH | 5.4 | 7.3 | 6.2 | 7.5 |

*4 APHA Hasen number (Americal Public Health Association)

The products were of quality not suitable for the production of polyurethane resins.

CONTROL EXAMPLE 3

Polyether-polyols A, B and C produced in Example 3 were treated by Method 4 in the preceding example in a large scale.

Crude polyether-polyol was uniformly mixed with 2% of water and then neutralized at 60° C. with bubbling carbon dioxide gas. The liquid was bubbled with nitrogen gas at a rate of 5 l/min. for 30 minutes, dehydrated by topping distillation for 30 minutes at 110° C. under vacuum, and filtered through a membrane filter (ULTRAFILTER, Miura Chemical Co., Ltd.) with the aid of diatomaceous earth. Samples were taken at different elaped times of filtration and the contents of Na and K in each fraction were analyzed. The results are shown in Table 4. The Na and K contents varried to a great extent.

TABLE 4

| Run No. | | 4-1 | 4-2 | 4-3 |
|---|---|---|---|---|
| Conditions | | | | |
| Polyether-polyol | | A | B | C |
| Amount of $CO_2$, g | | 970 | 350 | 910 |
| pH after neutralization | | 6.5 | 8.7 | 6.1 |
| Appearance | | Cloudy | Cloudy | Cloudy |
| Time lapsed, min. | | | | |
| 10 | K (ppm) | 20 | 0.1 | 25 |
| | Na | 0.1 | 200 | 0.5 |
| 20 | K | 16 | 0.1 | 20 |
| | Na | 0.1 | 100 | 0.4 |
| 30 | K | 10 | 0.1 | 18 |
| | Na | 0.1 | 77 | 0.4 |
| 60 | K | 9 | 0.1 | 15 |
| | Na | 0.1 | 60 | 0.1 |
| 80 | K | 8 | 0.1 | 13 |
| | Na | 0.1 | 40 | 0.1 |
| 100 | K | 7 | 0.1 | 13 |
| | Na | 0.1 | 45 | 0.1 |
| 120 | K | 7 | 0.1 | 12 |
| | Na | 0.1 | 40 | 0.1 |
| 140 | K | 7 | 0.1 | 12 |
| | Na | 0.1 | 30 | 0.1 |
| 160 | K | 7 | 0.1 | 14 |
| | Na | 0.1 | 30 | 0.1 |
| 180 | K | 15 | finish | 12 |
| | Na | 0.1 | | 0.1 |
| 200 | K | 150 | | 11 |
| | Na | 2 | | 0.1 |
| 220 | K | finish | | finish |
| | Na | | | |

The above has been offered for illustrative purposes only, and it is not for the purpose of limiting the scope of this invention which is defined in the claims below.

We claim:

1. In a method for purifying crude polyether-polyols containing an alkaline catalyst comprising the steps of:
    neutralizing said crude liquid polyether-polyol with a mineral acid having a dissociation constant of greater than $10^{-3}$ at 25° C.,
    distilling off water from said liquid, and
    filtering the same, the improvement which comprises adding a hydrate of a metal salt of said mineral acid to said liquid polyether-polyol at a stage before the distillation step for promoting the crystal growth of a salt formed from said alkaline catalyst by the neutralization.

2. The method according to claim 1, wherein an adsorbent is added to the neutralized liquid at a stage before the distillation step.

3. The method according to claim 1, wherein said mineral acid is selected from the group consisting of $H_2SO_4$, $HCl$, $HNO_3$, $HClO_2$, $NHSO_3H$, $H_2S_2O_3$, $H_2PO_2$, $H_4P_2O_7$, $HClO_3$, $HIO_3$, $H_3PO_4$, $H_3PO_3$ and $H_2SO_3$.

4. The method according to claim 1, wherein said hydrate is selected from the group consisting of $Na_2SO_3.7H_2O$, $Na_2HPO_4.12H_2O$, $NaH_2PO_4.H_2O$, $CaHPO_4.2H_2O$, $MgSO_4.H_2O$, $MgSO_4.7H_2O$, $K_2Mg(SO_4)_2.6H_2O$, $Na_2SO_4.10H_2O$, $CaSO_4.2H_2O$, $NaAl(SO_4)_2.12H_2O$, $KAl(SO_4)_2.12H_2O$, $ZnSO_4.7H_2O$, $Na_2S_2O_3.5H_2O$, $NaBr.2H_2O$, $CaCl_2.6H_2O$ and $NaBr.2H_2O$.

5. The method according to claim 2, wherein said adsorbent is selected from the group consisting of oxides, carbonates, hydroxides and silicates of Ca, Mg and Al, their complexes and bentonite.

6. The method according to claim 1, wherein said crude polyether-polyols are produced by reacting an organic compound having at least one active hydrogen atom with an alkylene oxide in the presence of an alkaline catalyst.

7. The method according to claim 6, wherein said organic compound having at least one hydrogen atom is selected from the group consisting of a monohydric alcohol, a dihydric alcohol, a polyhydric alcohol and an amine.

8. The method according to claim 6, wherein said alkylene oxide is selected from the group consisting of ethylene oxide, propylene oxide, butylene oxide and styrene oxide.

9. The method according to claim 6, wherein said alkaline catalyst is selected from the group consisting of metallic elements, alkoxides, hydroxides and carbonates of sodium and potassium.

10. The method according to claim 1, wherein said crude polyether-polyols are neutralized in the presence of water.

* * * * *